W. T. GERSTNER.
COUPLING.
APPLICATION FILED FEB. 21, 1913.
1,126,002.
Patented Jan. 26, 1915.
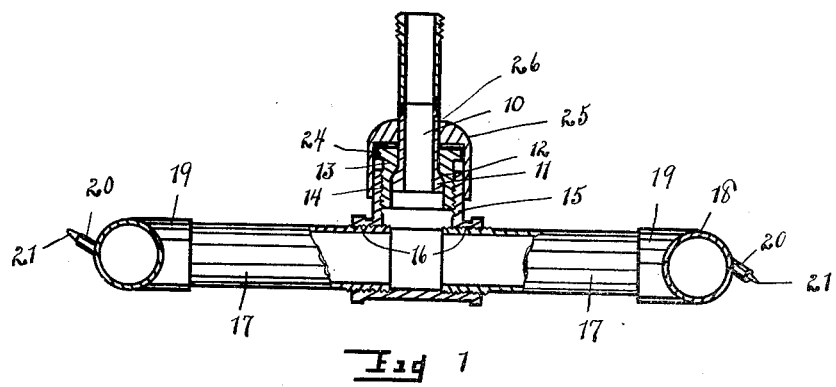
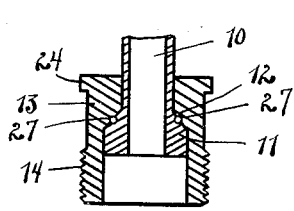
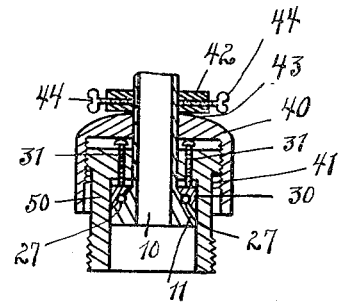
WITNESSES:
Samuel Sloan
Wm Townsend
INVENTOR
WILLIAM T. GERSTNER
BY Thomas L. Hilder
ATTORNEY

UNITED STATES PATENT OFFICE.

WILLIAM T. GERSTNER, OF UTICA, NEW YORK.

COUPLING.

1,126,002. Specification of Letters Patent. Patented Jan. 26, 1915.

Application filed February 21, 1913. Serial No. 749,787.

*To all whom it may concern:*

Be it known that I, WILLIAM T. GERSTNER, a citizen of the United States, residing at Utica, in the county of Oneida and State of New York, have invented certain new and useful Improvements in Couplings, of which the following is a specification, reference being had therein to the accompanying drawing.

My invention relates to a coupling, and I declare the following to be a full, clear, concise and exact description thereof, sufficient to enable any one skilled in the art to which it appertains to make and use the same, reference being had to the accompanying drawings in which like reference characters refer to like parts throughout the specification.

The object of the invention is to provide a simple, efficient swivel pipe coupling adapted for use more particularly in connection with fire extinguishers.

The object will the more readily appear by referring to the drawings in which:

Figure 1 is a vertical section of the coupling, showing the coupling attached to a rotatable wheel, partially in section, such as is used in fire extinguishers; Fig. 2 is an enlarged view, showing a vertical section of the coupling; Fig. 3 is an enlarged view, showing a vertical section of a modification of the swivel pipe coupling.

Referring more particularly to the drawings, the swivel pipe coupling embodies a pipe 10 which has a flange at 11, adapted to abut against the flange 12 of the member 13 screw threaded at 14 to the elbow union 15. The union 15 is screw threaded at 16—16 for the reception of the ends of the pipes 17—17, leading to and connected with the circular pipe or wheel 18, at 19—19. The circular pipe 18 is provided with a plurality of nozzles 20, which are closed with the caps or plugs 21 made of metal that is fusible at a relatively low temperature. The plugs 21 may be connected by a fuse, whereby the melting of one of the said plugs 21 will insure the melting of all of the said plugs 21 in the same circular pipe 18. The union of the flange 11 of the pipe 10 and of the flange 12 of the member 13 is made on a bevel, whereby to effect a more perfect fitting joint at that location. The pipe 10 and the member 13 are also preferably constructed of brass for bearing purposes. The member 13 is provided with a nut portion 24 for convenience in assembling the said member 13 to the elbow 15. There is also provided a cap 25 having an aperture 26 adapted for the projection of the pipe 10 and having a lower portion to prevent the entrance of the dust to the adjacent parts.

In Fig. 2 there is shown a modification embodying the ball members 27 disposed in suitable runways formed in the flanges 11 and 12 of the pipe 10 and the member 13, respectively.

Fig. 3 illustrates a still further modification in that a ring 30 is employed, whereby to adjust the tension on the ball members 27 so as to regulate the speed with which the circular pipe 18 may be revolved. The said ring 30 has a groove for the reception of the upper portions of the ball members 27 and is adjusted in a vertical manner by the screws 31—31. The cap 40 in this construction is provided with the threads 41 adapted to be mounted to the corresponding threads of the member 50, whereby the sleeve or collar 42 will abut against the upper surface 43 of the cap 40, when turned, and thereby draw the pipe 10 upward and urge the member 50 downward, so that the ring 30 will bear against the balls 27 to any desired degree. The sleeve or collar 42 is held in adjusted position along the pipe 10 by the wing nuts 44.

Having thus described my invention what I claim as new and desire to secure by Letters Patent is:

1. In a fire extinguisher, a union pipe, a member screw threaded to said union pipe, a flange on said member, a ring disposed adjacent said flange on said member, a pipe having a flange, balls mounted in a runway formed in said flange on said pipe and in said ring, screws for moving said ring with reference to the flange on said member, a cap screw threaded to said member, and an adjustable collar mounted on said pipe whereby to aid in adjusting the tension of said ring on said balls.

2. In a fire extinguisher, a union pipe, a member screw threaded to said union pipe, a flange on said member, an adjustable ring disposed adjacent said flange on said member, a pipe, a flange on said pipe, balls mounted in a runway formed in said flange on said pipe and in said ring, screws for adjusting the position of said ring with reference to the position of said flange on said pipe, a cap screw threaded to said member, an adjustable collar mounted on said pipe having a flange, whereby to aid in adjusting the tension on said balls, and winged set screws adapted to hold said collar in adjusted position along said pipe having a flange.

In testimony whereof I have affixed my signature in the presence of two witnesses.

WILLIAM T. GERSTNER.

Witnesses:
SAMUEL SLOAN,
S. SHELDON JUDSON.

Copies of this patent may be obtained for five cents each, by addressing the "Commissioner of Patents, Washington, D. C."